United States Patent [19]

Susa et al.

[11] 3,873,473

[45] Mar. 25, 1975

[54] SULPHIDE SOLID SOLUTION HAVING ROCK-SALT STRUCTURE AND METHOD OF PRODUCING THE SAME

[75] Inventors: Kenzo Susa, Hachioji; Masami Yajima, Koganei; Satoshi Taniguchi, Tokorozawa, all of Japan

[73] Assignee: Hitachi, Ltd., Tokyo, Japan

[22] Filed: May 15, 1973

[21] Appl. No.: 360,420

[30] Foreign Application Priority Data

| May 15, 1972 | Japan | 47-47184 |
| May 26, 1972 | Japan | 47-51645 |
| Nov. 6, 1972 | Japan | 47-110287 |
| Nov. 13, 1972 | Japan | 47-113006 |
| Nov. 13, 1972 | Japan | 47-113007 |

[52] U.S. Cl.............. 252/501, 252/518, 252/521, 423/21, 423/58
[51] Int. Cl............................................. G03c 1/72
[58] Field of Search...... 252/501, 518, 521; 423/21, 423/53, 58, 561

[56] References Cited
UNITED STATES PATENTS

| 3,087,799 | 4/1963 | Fahrig et al | 423/561 |
| 3,256,702 | 6/1966 | Henderson | 252/518 |
| 3,647,430 | 3/1972 | Hanada et al | 252/501 |
| 3,681,067 | 8/1972 | Hanada | 252/501 |

FOREIGN PATENTS OR APPLICATIONS

| 4,538,665 | 7/1967 | Japan | 252/501 |

*Primary Examiner*—T. H. Tubbesing
*Assistant Examiner*—H. A. Birmiel
*Attorney, Agent, or Firm*—Craig & Antonelli

[57] ABSTRACT

This invention provides a sulphide solid solution which is expressed by the general formula (Cd, A)S in which A is at least one element selected from the group consisting of Yb, Cr, Mg, Sr, Ca, La, Ce, Pr, Nd, Pm, Sm, Eu, Gd, Tb, Dy, Ho, Er, Tm, Lu, Y, Pb, Sn and Ge and which has a rock-salt structure under normal atmospheric pressure, and a method of producing the same. This sulphide solid solution is prepared by mixing the above constitutional elements, namely Cd, A and S, in the form of simple elements or in the form of sulphides of Cd and A to have a composition corresponding to said formula, holding the mixture under high temperature and high pressure conditions, lowering the temperature to room temperature and then lowering the pressure to normal atmospheric pressure.

7 Claims, No Drawings

SULPHIDE SOLID SOLUTION HAVING ROCK-SALT STRUCTURE AND METHOD OF PRODUCING THE SAME

BACKGROUND OF THE INVENTION

This invention relates to a novel solid solution consisting of cadmium sulphide and sulphides of other metallic elements and having a rock-salt structure under normal atmospheric pressure and room temperature, and to a method of producing the same.

Heretofore, studies have been made on the phase stability in cadmium sulphide, and it is known that cadmium sulphide includes three phases varying depending on the temperature and pressure conditions. More specifically, cadmiun sulphide takes a stable crystal structure of the zincblend type of wurtzite type at a low temperature not exceeding about 500°C. and a low pressure not exceeding about 15 Kbar and it takes a stable rock-salt structure at a low temperature not exceeding about 500°C. and a high pressure exceeding about 15 Kbar. In the high temperature and high pressure range other than mentioned above, cadmium sulphide is present in the form of a stable phase. However, although cadmium sulphide has a stable phase under a high pressure, when the pressure is lowered to normal atmospheric pressure, the phase is easily converted to an atmospheric pressure phase. Accordingly, it is substantially impossible to obtain cadmium sulphide that can possess a rock-salt structure under normal atmospheric pressure. Manganese and chlorine have been known as additive elements for stabilizing the rock-salt crytstal structure in cadmium sulphide. However, in case such additive element is added to cadmium sulphide in the form of, for example, MnS or $CdCl_2$ and the mixture is maintained under high temperature and high pressure conditions, if the pressure is lowered to normal atmospheric pressure, the phase is converted to the atmospheric pressure phase. Thus, a particular effect can be hardly obtained by addition of such additive elements. Accordingly, it can be said that a composition composed mainly of cadmium sulphide and having a rock-salt structure under room temperature and normal atmospheric pressure has not been found. Only mangganese sulphide has been known to form a solid solution with cadmium sulphide which has a rock-salt crystal structure under room temperature and normal atmospheric pressure.

Further, there has not heretofore been disclosed in the art a method of producing a sulphide solid solution by holding the raw material under high temperature and high pressure conditions.

SUMMARY OF THE INVENTION

A primary object of this invention is to provide a novel solid solution of cadmium sulphide with a sulphide of an alkaline earth metal, a rare earth metal, a group IV metallic element or chromium.

A secondary object of this invention is to provide a novel substance composed mainly of cadmium sulphide and having a rock-salt crystal structure under room temperature and normal atmospheric pressure.

As the stable crystal structure of the sulphide under room temperature and normal atmospheric pressure, there may be mentioned the zincblende type crystal of cadmium sulphide, the rock-salt type crystal structure of an alkaline earth metal sulphide or a rare earth metal monosulphide, the rock-salt or rock-salt-like crystal structure of a group IV element monosulphide, and the nickel arsenide structure of chromium monosulphide.

The presence of a solid solution of cadmium sulphide with such sulphide as mentioned above has not been confirmed.

For instance, a rare earth metal is usually inclined to take a form of a trivalent cation. Accordingly, since S is present in the form of a divalent anion in the rare earth metal monosulphide and excessive electrons are present in the monosulphide, the monosulphide has metallic properties. Therfore, if there be present a solid solution of cadmium sulphide, having semiconductor properties, with such rare earth metal monosulphide, it will be possible to change physical properties such as electric properties so as to obtain a semiconductor, semi-metal or metal by changing the composition of such solid solution, and it will be also possible to obtain a novel electronic material having in combination characteristics of semicondutor, semi-mental and metal or having novel properties that have not been known. Sulphides other than those mentioned above have special characteristics utilizable in the field of the electronic industry. Accordingly, if there be present a solid solution of cadmium sulphide with such sulphide, it will be possible to obtain novel electronic materials having characteristics of such sulphides in combination or having novel properties that have not been known in the art.

Further, it is expected that cadmium sulphide having a rock-salt type structure of the high pressure phase, as well as cadmium sulphide of the normal atmospheric pressure, will exhibit semiconductor characteristics and if it be possible to collect a solid solution composed mainly of such cadmium sulphide under normal atmospheric pressure, it is expected that such solids solution will be a material having novel properties that have not heretofore been known.

Such expectations can be almost attained by the preparation method of this invention utilizing high temperature and high pressure.

More specifically, in this invention, in order to obtain a sulphide solid solution having a rock-salt crystal structure under room temperature and normal atmospheric pressure, which is represented by the general formula (Cd, A)S in which A is at least one element selected from the group consisting of Yb, Cr, Mg, Sr, Ca, La, Ce, Pr, Nd, Pm, Sm, Eu, Gd, Tb, Dy, Ho, Er, Tm, Lu, Y, Pb, Sn and Ge, there is provided a method comprising the steps of mixing A, Cd and S in the form of simple elements, sulphides of A and Cd or a mixture thereof in such an elemental ratio as will result in the above element composition (i.e. wherein the mixture of Cd and A is in an atomic ratio of about 1:1 with S), holding the mixture under high temperature and high pressure conditions where a sulphide solid solution of the above general formular can be present in the thermodynamically stable state while retaining the rock-salt crystal structure, lowering the temperature to room temperature and then lowering the pressure to normal atmospheric pressure.

In this invention, a novel solid solution having characteristics such as mentioned above can be obtained by employing the above preparation method.

It is an essential requirement that in the raw material maintained under high temperature and high pressure, the temperature is primarily lowered to room temperature and then the pressure is reduced to normal atmospheric pressure. If the pressure is initially reduced to normaal atmospheric pressure, outside the region of the stable rock-salt structure, decomposition reactions are caused to occur.

A preferred amount of A to be incorporated for obtaining a sulphide solid solution having the rock-salt type crystal structure is more than 2.5 at .% in the case of A representing Yb, Sr, La, Ce, Pr, Nd, Pm, Sm, Eu, Gd, Tb, Dy, Ho, Er, Tm, Lu, Y or Pb; 5 to 20 at .% in the case of A representing Cr; more than 20 at .% in the case of A representing Mg; more than 1.5 at .% in the case of A representing Ca; 2.5 to 37.5 at .% in the case of A representing Sn; or 5.0 to 37.5 at. % in the case of A representing Ge. A more preferred amount of A incorporated is 5 to 15 at. % in the case of A representing Yb; 10 to 15 at .% in the case of A representing Cr; more than 25 at .% in the case of A representing Mg; more than 10 at .% in the case of A representing Sr; more than 2.5 at .% in the case of A representing Ca, more than 5 at .% in the case of A representing La, Ce, Pr, Nd, Pm, Sm, Eu, Gd, Tb, Dy, Ho, Er, Tm, Lu, Y or Pb; 5 to 18 at. % in the case of A representing Sn, or 10 to 15 at .% in the case of A representing Ge. In case A is incorporated in such amount, the intended solid solution can be obtained in a yield of substantially 100 percent and the content of A in the resulting sulphide solid solution of the rock-salt type crystal structure is substantially equal to the amount of A incorporated. In the case of A being Yb, formation of a sulphide solid solution of the rock-salt type crystal structure containing Yb in an amount exceeding 15 at .% could be confirmed, and if the pressure and temperature are adjusted appropriately, the intended solid solution can be obtained when A is incorporated in an amount exceeding 5 at .%.

Among sulphides of alkaline earth metals, barium sulphide and beryllium sulphide do not form a solid solution of the rock-salt type crystal structure intended in this invention with cadmium sulphide. However, in case in a solid solution containing a sulphide of other alkaline earth metal, i.e., Mg, Ca or Sr, a part of Mg, Ca or Sr is replaced with Ba or Be or Ba and Be, it is possible to obtain a solid solution of the rock-salt type crystal structure containing barium sulphide or beryllium sulphide.

For better illustration, this invention will now be described by reference to the following Examples and Referential Examples.

DESCRIPTION OF THE PRESENTLY PREFERRED EMBODIMENTS

EXAMPLE 1

Powdery cadmium sulphide and ytterbium sulphide were mixed sufficiently in such amounts as could give a chemical composition of $Cd_{1-x}Yb_xS$ in which $x$ was 0.1, and the mixture was packed in a capsule of boron nitride and was charged into a pyrophellite as a pressure medium. The pyrophellite was held under conditions of 40 Kbar and 1,000°C. for about 1 hour by employing a girdle type, super high pressure- and high temperature-generating vessel. Then, the temperature was lowered to room temperature and subsequently the pressure was reduced to one atmosphere to obtain a solid solution of the rock-salt type having the composition $Cd_{0.9}Yb_{0.1}S$.

Results of the X-ray diffraction of the resulting rock-salt type solid solution are shown in Table 1. From the results, the lattice constant $a_o$ was calculated to be 5.450 A.

Table 1

Results of X-Ray Diffraction of Rock-Salt Type Solid Solution of $Cd_{0.9}Yb_{0.1}S$

| Lattice Spacing (Å) | Miller's Index | Intensity |
|---|---|---|
| 3.148 | 111 | 68 |
| 2.727 | 200 | 100 |
| 1.938 | 220 | 59 |
| 1.644 | 311 | 16 |
| 1.574 | 222 | 12 |

EXAMPLE 2

A raw material having a chemical composition $Cd_{1-x}Yb_xS$ in which $x$ was 0.5 was held under conditions of 40 Kbar and 1,600°C. in the same manner as in Example 1 to obtain a two-phase mixture consisting of a rock-salt type solid solution $Cd_{1-x}Yb_xS$ and a crystal phase of the $Th_3P_4$ type.

As a result of the X-ray diffraction, it was confirmed that the lattice constant $a_o$ of the rock-salt type solid solution $Cd_{1-x}Yb_xS$ obtained was 5.462 A. When the Vegard's rule was applied by employing the lattice constant $a_o$ of 5.450 A in the rock-salt type solid solution $Cd_{0.9}Yb_{0.1}S$ obtained in Example 1 and the lattice constant $a_o$ of 5.680 A of YbS, it was found that the solid solubility for x in the above solid solution having an $a_o$ of 5.462 A was 0.150 In other words, the limit of the solid solubility for x attainable by the above treatment was 0.15.

EXAMPLE 3

The procedures of Example 2 were repeated in the same manner except that the pressure was maintained at 20 Kbar. A similar two-phase mixture was obtained in which the lattice constant $a_o$ of the rock-salt type solid solution was 5.500 A and the solid solubility for $x$ was 0.3. This value corresponded to the limit of the solid solubility attainable by the treatment of this Example.

EXAMPLE 4

The procedures of Example 3 were repeated in the same manner except that the value of $x$ in the chemical composition of the raw material was changed to 0.3 and the temperature was maintained at about 800°C. to obtain a single phase of a rock-salt type solid solution $Cd_{0.7}Yb_{0.3}S$, the lattice constant $a_o$ of which was 5.495 A.

The results of Examples 3 and 4 illustrate that the solid solubility for a value of $x$ of 0.3 can be obtained by the treatment conducted under 20 Kbar.

Referential Example 1

The procedures of Example 1 were repeated in the same manner except that the value of x in the chemical composition of the raw material was changed to 0.05. As a result there was obtained a mixture phase consisting of cadmium sulphide of the zincblende type of a poor crystallinity and cadmium sulphide of the wurtzite type of a poor crystallinity, but no rock-salt type cadmium sulphide was obtained.

Referential Example 2

The procedures of Example 1 were repeated in the same manner except that the pressure condition was changed to 10 Kbar. A mixture phase of cadmium sulphide of the wurtzite type and ytterbium sulphide was obtained, but rock-salt type cadmium sulphide was not obtained.

As is seen from the foregoing, when in the chemical composition $Cd_{1-x}Yb_xS$ the value of $x$ is adjusted within a range of 0.1 to 0.3, namely when Yb is incorporated in an amount of 5 to 15 at. %, a solid solution having a rock-salt type crystal structure can be obtained with ease and certainty.

However, the range of the amount incorporated of ytterbium is not limited to the above range of 5 to 15 at. %. As is seen from the fact that the solid solubility limit x obtained by the treatment of Example 2 conducted under 40 Kbar was 0.15 but it was increased to 0.3 by the treatment of Example 3 conducted under 20 Kbar, the equilibrium reaction of Cds + YbS ⇄ (Cd, Y)S under high temperature and high pressure advances toward the right side with reduction of the pressure and a higher solid solubility can be obtained. Accordingly, if the synthesis is carried out under a pressure that is lower than 20 Kbar but is higher than the pressure necessary for the synthesis (it is 15 Kbar in the case of CdS alone and decreases with increase of the amount incorporated of Yb), it is possible to obtain a solid solubility for x greater than 0.3. This fact could be confirmed by the following experiment.

EXAMPLE 5

The procedures of Example 1 were repeated in the same manner except that the value of $x$ in the chemical composition of the raw material was adjusted to 0.4 and the synthesis was carried out for 1 hour under conditions of about 1,000°C. and 10 Kbar, to obtain a single phase consisting of a rock-salt type solid solution $Cd_{0.6}Yb_{0.4}S$ having a lattice constant $a_o$ of 5.525 A. In the case of a raw material containing Yb in such a relatively great amount, a small amount of ytterbium oxide and other by-products are readily formed. Accordingly, a sufficient care should be taken at the time of the synthesis.

In order to maintain the rock-salt type crystal structure while the synthesized solid solution is being cooled, it is necessary to add at least a minimum amount of ytterbium. In the foregoing Examples, the minimum amount of ytterbium added for obtaining the intended solid solution was 5 at. %, but of course, this value is not the lower limit of the amount incorporated of Yb. In view of the result of Referential Example 1 that when the value of x was 0.05, the phase change was brought about during cooling and pressure-reducing steps and the fact that the above minimum amount of ytterbium incorporated was 5 at. %, it is evident that the lower limit of the amount incorporated of ytterbium is within a range of 2.5 at. % to 5 at. %.

EXAMPLE 6

Powdery cadmium sulphide and chromium sulphide were mixed sufficiently in such amounts as gave a chemical composition $Cd_{1-x}Cr_xS$ in which $x$ was 0.2, and the mixture was packed in a boron nitride capsule and charged into a pyrophillite sample cell as a pressure medium. This sample cell was constructed in a girdle type, super high pressure- and high temperature-generating apparatus and was maintained for about 1 hour under conditions of 20 Kbar and 1,000°C. Then, the temperature was lowered to room temperature and subsequently the pressure was reduced to 1 atmosphere to obtain a rock-salt type solid solution $Cd_{0.8}Cr_{0.2}S$.

Results of the X-ray diffraction of the so formed rock-salt type solid solution are shown in Table 2. From the results, the lattice constant $a_o$ of 5.424 A was calculated.

Table 2

| Results of X-Ray Diffraction of Rock-Salt Type Solid Solution $Cd_{0.8}Cr_{0.2}S$ | | |
|---|---|---|
| Lattice Spacing (A) | Miller's Index | Relative Intensity |
| 3.135 | 111 | 53 |
| 2.711 | 200 | 100 |
| 1.918 | 220 | 48 |
| 1.637 | 311 | 14 |
| 1.567 | 222 | 12 |

EXAMPLE 7

A raw material same as used in Example 6 except that the value of $x$ was changed to 0.5 was treated under 20 Kbar and 1,000°C. for 1 hour in the same manner as in Example 6 to obtain a mixture of a rock-salt type solid solution $Cd_{1-x}Cr_xS$ and CrS of the NiAs type. As a result of the X-ray diffraction, it was confirmed that the lattice constant $a_o$ of this rock-salt type solid solution $Cd_{1-x}Cr_xS$ was 5.423 A.

EXAMPLE 8

The procedures of Example 7 were repeated in the same manner except that the pressure was changed to 40 Kbar. A similar two-phase mixture was obtained, but the yield of the rock-salt type solid solution was higher than that obtained in Example 7. From the results obtained in this Example, it was found that even if the synthesis pressure is elevated to 40 Kbar, the limit of the solid solubility does not exceed a value of $x$ of 0.5.

EXAMPLE 9

The procedures of Example 6 were repeated in the same manner except that a raw material in which the value of x in the chemical composition $Cd_{1-x}Cr_xS$ was 0.3 was treated for 1 hour under conditions of 20 Kbar and 1,000°C. to obtain a single phase of $Cd_{0.7}Cr_{0.3}S$, the lattice constant $a_o$ of which was 5.424 A.

EXAMPLE 10

The procedures of Example 6 were repeated in the same manner except that a raw material in which the value of x in the chemical composition $Cd_{1-x}Cr_xS$ was 0.4 was treated for 1 hour under conditions of 20 Kbar and 1,000°C. to obtain a two-phase mixture of a rock-salt type solid solution $Cd_{1-x}Cr_x S$ and a very minute amount, detectable only by the X-ray diffraction analysis, of CrS of the NiAs type. From the results of this Example, it was found that in case the synthesis temperature is 1,000°C., the limit of the solid solubility in the rock-salt type $Cd_{1-x}Cr_x S$ is obtained when $x$ is about 0.4.

EXAMPLE 11

The procedures of Example 6 were repeated in the same manner except that a raw material in which the value of $x$ in the chemical composition $Cd_{1-x}Cr_xS$ was 0.1 was treated for 1 hour under conditions of 20 Kbar and 1,000°C., to obtain a rock-salt type cadmium sulphide-chromium sulphide solid solution and a mixture of cadmium sulphide of the zincblende type of a poor crystallinity and cadmium sulphide of the wurtzite type of a poor crystallinity. From the results of this Example, it was found that when the synthesis is conducted under conditions of 20 Kbar and 1,000°C., in order to obtain a single phase of a rock-salt type cadmium sulphide solution it is necessary to add CrS in an amount of at least 5 at. %.

EXAMPLE 12

The procedures of Example 6 were repeated in the same manner except that the pressure condition was changed to 15 Kbar or 10 Kbar. In the former case a rock-salt type cadmium sulphide solid solution was obtained, but in the latter case such solid solution was not obtained. From the foregoing results, it was found that at a temperature approximating 1,000°C., the pressure necessary for maintaining the rock-salt type solid solution in the thermodynamically stable state is higher than 10 Kbar.

EXAMPLE 13

The procedures of Example 6 were repeated in the same manner except that the temperature condition was changed to 700°C. or 1,600°C. In each case, a rock-salt type solid solution $Cd_{0.8}Cr_{0.2}S$ was obtained.

From the results of the foregoing Examples 6, 8 and 12, it is seen that in case chromium is added in an amount of 10 to 15 at. %, a solid solution of cadmium sulphide and chromium sulphide having a rock-salt type crystal structure can be synthesized with ease and certainty. However, the range of the amount incorporated of chromium is not limited to 10 to 15 at. %. From the foregoing Examples relating to cadmium sulphide-chromium sulphide rock-salt type solid solutions, it is evident that the upper limit of the amount of chromium dissolved in the rock-salt type solid solution and the amount of chromium necessary for maintaining the rock-salt type crystal structure of the synthesized solid solution while it is being cooled are 20 at. % and 5 at. %, respectively. However, it is expected that these values may be varied to some extent depending on synthesis conditions. In other words, the amount added of chromium ranging from 5 to 20 at. % is effective for obtaining a rock-salt type structure, and the amount of chromium ranging from 10 to 15 at. % is much preferred.

In case chromium is added in an amount of 10 to 15 at. %, the yield of a cadmium sulphide-chromium sulphide solid solution having a rock-salt crystal structure under room temperature and normal atmospheric pressure is substantially 100 percent. In the case of the chromium about 5 to 20 at .%, the yield is always higher than 90 percent.

EXAMPLE 14

Powdery cadmium sulphide and calcium sulphide were mixed sufficiently in such amounts as gave a chemical composition $Cd_{1-x}Ca_xS$ in which x was 0.1, and the mixture was packed in a boron nitride capsule and charged into a pyrophillite installed with a carbon heater as a pressure medium. This pyrophillite was maintained for about 10 hours under conditions of 20 Kbar and 600°C. by employing a girdle type, super high pressure- and high temperature-generating vessel. Then, the temperature was lowered to room temperature and subsequently the pressure was reduced to one atmosphere to obtain a rock-salt type solid solution $Cd_{0.9}Ca_{0.1}S$.

The results of the X-ray diffraction of the so synthesized solid solution are shown in Table 3. From these results, the lattice constant $a_o$ of the solid solution was calculated to be 5.460 A. , 170

The specific resistance of the solid solution at room temperature was $1.5 \times 10^7$ Ω—cm, and by the measurement of the optical absorption edge, it was found that the band gap of the energy band structure was 2.1 eV.

EXAMPLE 15

The procedures of Example 14 were repeated in the same manner except that the synthesis was carried out for 10 hours under conditions of 20 Kbar and 400°C., to obtain a two phase mixture consisting of a rock-salt type solid solution $Cd_{1-x}Ca_xS$ and unreacted cadmium sulphide having a normal pressure phase. As a result of the X-ray diffraction analysis, the rock-salt type solid solution was found to have a lattice constant $a_o$ of 5.469 A.

EXAMPLE 16

The procedures of Example 14 were repeated in the same manner except that the value of x in the chemical composition $Cd_{1-x}Ca_xS$ of the raw material was changed to 0.05, to obtain a single phase of a solid solution $Cd_{0.95}Ca_{0.05}S$ having a rock-salt type crystal structure. As a result of the X-ray diffraction analysis, the rock-salt type solid solution was found to have a lattice constant $a_o$ of 5.450 A. The specific resistance of the solid solution at room temperature was $1.2 \times 10^8$ Ω—cm.

EXAMPLE 17

The procedures of Example 14 were repeated in the same manner except that the value of x in the starting chemical composition $Cd_{1-x}Ca_xS$ of the raw material was changed to 0.03 (the amount of Ca being 1.5 at. %), to obtain a mixture containing a minute amount of a rock-salt type solid solution.

EXAMPLE 18

The procedures of Example 14 were repeated in the same manner except that a raw material having a chemical composition $Cd_{1-x}Ca_xS$ in which x was 0.3 was treated under conditions of 20 Kbar and 1,000°C. for 1 hour, to obtain a single phase of a rock-salt type solid solution $Cd_{0.7}Ca_{0.3}S$. As a result of the X-ray diffraction analysis, the solid solution was found to have a lattice constant $a_o$ of 5.505 A. The specific resistance of the solid solution at room temperature was $3.0 \times 10^7$ Ω—cm, and as a result of the measurement of the optical absorption edge, the band gap of the energy band structure in the solid solution was found to be 2.3 eV.

EXAMPLE 19

The procedures of Example 14 were repeated in the same manner except that a raw material having a chemical composition $Cd_{1-x}Ca_xS$ in which x was 0.5 was treated for 3 hours under conditions of 20 Kbar and 700°C., to obtain a single phase of a rock-salt type solid solution $Cd_{0.5}Ca_{0.5}S$.

As a result of the X-ray diffraction analysis, the lattice constant $a_o$ of the solid solution was found to be 5.560 A. The specific resistance of the solid solution at room temperature was $5.2 \times 10^8$ Ω—cm, and a result of the measurement of the optical absorption edge, the band gap of the energy band structure was found to be 2.7 eV.

EXAMPLE 20

The procedures of EXample 19 were repeated in the same manner except that the pressure was changed to 10 Kbar, to obtain a single phase of a rock-salt type solid solution $Cd_{0.5}Ca_{0.5}S$ having a lattice constant $a_o$ of 5.560 A. The specific resistance of the so synthesized solid solution at room temperature was $9.1 \times 10^7$ Ωcm.

EXAMPLE 21

The procedures of Example 14 were repeated in the same manner except that the value of x in the chemical composition $Cd_{1-x}Ca_xS$ was changed to 0.75, to obtain a single phase of a rock-salt type solid solution $Cd_{0.25}Ca_{0.75}S$. As a result of the X-ray diffraction analysis, the solid solution was found to have a lattice constant $a_o$ of 5.625 A. The specific resistance of the solid solution at room temperature was $2.2 \times 10^8$ Ω—cm.

From the foregoing Examples relating to cadmium sulphide-calcium sulphide solid solutions, it is seen that when the lattice constants $a_o$ of rock-salt type solid solutions $Cd_{1-x}Ca_xS$ obtained in these Examples and both extreme sulphides, i.e., CdS and CaS, are plotted with respect to the value of x in the composition, a curve similar to a straight line can be obtained. Further, the fact that in each composition a single phase was obtained indicates that in the CdS-CaS system, a rock-salt type all proportional solid solution is present under the specific high temperature and high pressure conditions of this invention.

EXAMPLE 22

Powdery cadmium sulphide and metallic magnesium powder were sufficiently mixed together with sulphur in such amounts as gave a chemical composition $Cd_{1-x}Mg_xS$ in which x was 0.5, and in the same manner as described in Example 14 the mixture was treated for 1 hour under conditions of 20 Kbar and 1,000°C., to obtain a rock-salt type solid solution $Cd_{0.5}Mg_{0.5}$. As a result of the X-ray diffraction, the solid solution was found to have a lattice constant $a_o$ of 5.310 A. The specific resistance of this solid solution at room temperature was $3.5 \times 10^7$ Ω—cm.

EXAMPLE 23

The procedures of Example 22 were repeated in the same manner except that the value of x in the starting chemical composition was changed to 0.8, to obtain a rock-salt type solid solution $Cd_{0.2}Mg_{0.8}S$. As a result of the X-ray diffraction, the so-formed solid solution was found to have a lattice constant $a_o$ of 5.265 A. The specific resistance of the solid solution at room temperature was $5.0 \times 10^8$ Ω—cm.

When the lattice constants $a_o$ of rock-salt type solid solutions $Cd_{1-x}Mg_xS$ obtained in Examples 22 and 23 and both extreme sulphides, i.e., CdS and MgS, are plotted with respect to the value of x in the composition, a monotonous curve is obtained.

EXAMPLE 24

Procedures of Example 22 were repeated in the same manner except that a raw material having a chemical $Cd_{1-x}Mg_xS$ in which x was 0.4 (the amount of Mg being 20 at .%) was treated for 10 hours under conditions of 20 Kbar and 600°C., to obtain a mixture containing a minute amount of a rock-salt type solid solution.

EXAMPLE 25

Powdery cadmium sulphide and strontium sulphide were mixed sufficiently in such amounts to provide a chemical composition of $Cd_{1-x}Sr_xS$ in which x was 0.3, and the mixture was treated under the same synthesis conditions described in Example 14, to obtain a rock-salt type solid solution $Cd_{0.7}Sr_{0.3}S$. As a result of the X-ray diffraction analysis, the solid solution was found to have a lattice constant $a_o$ of 5.527 A. The specific resistance of the solid solution at room temperature was $7.1 \times 10^6$ Ω—cm.

EXAMPLE 26

The procedures of Example 25 were repeated in the same manner except that the value of x in the chemical composition was changed to 0.2, to obtain a rock-salt type solid solution $Cd_{0.8}Sr_{0.2}S$. As a result of the X-ray diffraction analysis, the solid solution was found to have a lattice constant $a_o$ of 5.507 A. The specific resistance of the solid solution at room temperature was $8.8 \times 10^7$ Ω—cm.

When the lattice constants $a_o$ of the rock-salt type solid solution obtained in Examples 25 and 26 and both extreme sulphides, i.e., CdS and SrS, are plotted with respect to the value of x in the composition, a monotonous curve is obtained.

EXAMPLE 27

The procedures of Example 25 were repeated in the same manner except that the value of x in the chemical composition of the raw material was changed to 0.1, and as a result, there was obtained a mixture of a rock-salt type solid solution and cadmium sulphide of the α—phase.

EXAMPLE 28

The procedures of Example 25 were repeated in the same manner except that the value of x in the chemical composition of the raw material was changed to 0.05 (the amount of Sr being 2.5 at. %). As a result, there was obtained a mixture containing a minute amount of a rock-salt type solid solution.

EXAMPLE 29

Powdery cadmium sulphide, calcium sulphide and strontium sulphide were mixed sufficiently in such amounts to provide a chemical composition of $Cd_{1-x-y}Ca_xSr_yS$ in which x was 0.2 and y was 0.1, and the mixture was treated in the same manner as described in Example 14, to obtain a rock-salt type solid solution $Cd_{0.7}Ca_{0.2}Sr_{0.1}S$. As a result of the X-ray diffraction analysis, the solid solution was found to have a lattice constant $ao$ of 5.516 A. The specific resistance of the solid solution at room temperature was $6.2 \times 10^7$ Ω—cm.

Referential Example 3

Cadmium sulphide and barium sulphide were mixed sufficiently in such amounts to provide a chemical composition $Cd_{1-x}Ba_xS$ in which the value of x was 0.5, and the resulting mixture was treated in the same manner as described in Example 14. No rock-salt type solid solution could be obtained.

EXAMPLE 30

Cadmium sulphide, calcium sulphide and barium sulphide were mixed sufficiently in such amounts to provide a chemical composition $Cd_{1-x}Ca_{x-y}Ba_y$ in which the value of $x$ was 0.3 and the value of y was 0.05, and the resulting mixture was treated in the same manner as described in Example 14, to obtain a rock-salt type solid solution $Cd_{0.7}Ca_{0.25}Ba_{0.05}S$. As a result of the X-ray diffraction analysis, the rock-salt type solid solution was found to have a lattice constant $a_o$ of 5.530 A. The specific resistance of the solid solution at room temperature was $9.0 \times 10^6$ Ω—cm.

Referential Example 4

Cadmium sulphide and beryllium sulphide were mixed sufficiently in such amounts to provide a chemical composition $Cd_{1-x}Be_xS$ in which $x$ was 0.5, and the mixture was treated in the same manner as described in Example 14. No rock-salt type solid solution could be obtained.

EXAMPLE 31

Cadmium sulphide, magnesium sulphide and beryllium sulphide were mixed sufficiently in such amounts to provide a chemical composition $Cd_{1-x}Mg_{x-y}Be_yS$ in which $x$ was 0.5 and y was 0.05. The resulting mixture was treated in the same manner as described in Example 14, to obtain a rock-salt type solid solution $Cd_{0.5}Mg_{0.45}Be_{0.05}S$. As a result of the X-ray diffraction analysis, the solid solution was found to have a lattice constant $a_o$ of 5.294 A. The specific resistance of the solid solution at room temperature was $1.0 \times 10^7$ Ω—cm.

EXAMPLE 32

Powdery cadmium sulphide and gadolinium monosulphide were mixed sufficiently in such amounts to provide a chemical composition $Cd_{1-x}Gd_xS$ in which $x$ was 0.1, and the mixture was packed in a boron nitride capsule. The capsule was charged in a pyrophellite installed with a carbon heater as a pressure medium.

Results of the X-ray diffraction of the rock-salt type solid solution $Cd_{0.9}Gd_{0.1}S$ are shown in Table 4. From these results, the lattice constant $a_o$ of the solid solution was calculated to be 5.465 A.

Table 4

Results of X-Ray Diffraction of Rock-Salt Type Solid Solution $Cd_{0.9}Gd_{0.1}S$

| Lattice Spacing (Å) | Miller's Index | Intensity |
|---|---|---|
| 3.155 | 111 | 69 |
| 2.730 | 200 | 100 |
| 1.930 | 220 | 57 |
| 1.648 | 311 | 20 |
| 1.578 | 222 | 16 |

The specific resistance measured at room temperature of the above solid solution was $1.2 \times 10^2$ Ω—cm.

EXAMPLES 33 to 35

Procedures of Example 32 were repeated by changing the value of $x$, the temperature and the pressure as indicated in Table 5, to obtain rock-salt type solid solutions $Cd_{1-x}Gd_xS$. Results are shown in Table 5.

EXAMPLE 36

The procedures of Example 32 were repeated in the same manner except that the value of x in the chemical composition of the raw material was changed to 0.05 (the amount of Gd being 2.5 at. %), to obtain a mixture Table 5  Results of High-Pressure Synthesis of Rock-Salt Type Solid Solutions $Cd_{1-x}Gd_xS$

|  | Value of x in composition | Pressure (Kbar) | Temperature (°C.) | Time (hours) | Product Phase | Lattice constant (Å) | Specific Resistance (Ω -cm) |
|---|---|---|---|---|---|---|---|
| Example 32 | 0.1 | 20 | 700 | 2 | single phase of rock-salt type | 5.465 | $1.2 \times 10^2$ |
| " 33 | 0.2 | 20 | 700 | 2 | " | 5.485 | $2.5 \times 10$ |
| " 34 | 0.5 | 20 | 700 | 2 | rock-salt type phase + $Th_3P_4$ phase | 5.525 | - |
| " 35 | 0.5 | 10 | 700 | 2 | single phase of rock-salt type | 5.540 | 8.6 |

This pyrophellite was maintained for about 2 hours under conditions of 20 Kbar and 700°C. by employing a girdle-type, super high pressure- and high temperature-generating vessel. Then, the temperature was lowered to room temperature and subsequently the pressure was reduced to one atmosphere, to obtain a stable, rock-salt type solid solution $Cd_{0.9}Gd_{0.1}S$.

containing a minute amount of a rock-salt type solid solution.

When lattice constants of rock-salt solid solutions obtained in Examples 32 to 35 and rock-salt type cadmium sulphide and gadolinium sulphide are plotted with respect to the value of $x$ in the composition, there is obtained a gentle curve. In case the gadolinium concentration is high as in Examples 34 to 35, in addition to the rock-salt type phase, the $Th_3P_4$ type phase is readily formed, and the oxysulfide $Gd_2O_2S$ phase is also readily formed. Therefore, a sufficient care should be taken during the preparation steps.

EXAMPLE 37

The procedures of Example 32 were repeated in the same manner except that instead of gadolinium sulphide, holmium sulphide (HoS) was used and the raw material in which the value of x in the chemical composition was 0.1 was treated for 2 hours under conditions of 20 Kbar and 700°C., to obtain a rock-salt type solid solution $Cd_{0.9}Ho_{0.1}S$. As a result of the X-ray diffraction analysis, the rock-salt type solid solution was found to have a lattice constant $a_o$ of 5.465 A.

The specific resistance of the solid solution at room temperature was $6.0 \times 10^3$ Ω—cm.

EXAMPLE 38

The procedures of Example 37 were repeated in the same manner except that holmium sesquisulphide ($Ho_2S_3$) was used instead of holmium monosulphide (HoS), to obtain a rock-salt type solid solution $Cd_{0.9}Ho_{0.1}S$. The specific resistance measured at room temperature of the solid solution was $6.8 \times 10^6$ Ω—cm.

EXAMPLE 39

The procedures of Example 38 were repeated in the same manner except that the synthesis reaction was carried out for 1 hour under conditions of 300 Kbar and 900°C., to obtain a rock-salt type solid solution $Cd_{0.9}Ho_{0.1}S$. The specific resistance measured at room temperature of the solid solution was $5.1 \times 10^5$ Ω—cm.

EXAMPLE 40

The procedures of Example 32 were repeated in the same manner except that holmium sulphide was used instead of gadolinium sulphide and the value of x in the chemical composition of the raw material was adjusted to 0.05 (the amount of Ho being 2.5 at. %), to obtain a mixture containing a minute amount of a rock-salt type solid solution.

As is seen from the results of Examples 37 to 39, holmium sulphide forms a rock-salt type solid solution with cadmium sulphide as in the case of gadolinium sulphide, and even when this solid solution is withdrawn under normal atmospheric pressure, the rock-salt type structure can be kept stable. Further, as is seen from the results of Examples 38 and 39, not only holmium monosulphide but also holmium sesquisulphide can be used as the raw material.

EXAMPLE 41

The procedures of Example 32 were repeated in the same manner except that lanthanum sulphide (LaS) was used instead of gadolinium sulphide and the value of x in the chemical composition of the raw material was adjusted to 0.1, to obtain a rock-salt type solid solution $Gd_{0.9}La_{0.1}S$. As a result of the X-ray diffraction analysis, the so obtained solid solution was found to have a lattice constant $a_o$ of 5.474 A. The specific resistance of the solid solution at room temperature was $5.2 \times 10^2$ Ω—cm.

EXAMPLE 42

The procedures of Example 41 were repeated in the same manner except that the value of x in the chemical composition of the raw material was changed to 0.05 (the amount of La being 2.5 at. %), to obtain a mixture containing a minute amount of a rock-salt type solid solution.

EXAMPLE 43

The procedures of Example 32 were repeated in the same manner except that lutetium sulphide (LuS) was used instead of gadolinium sulphide and the value of x in the chemical composition of the raw material was adjusted to 0.1, to obtain a rock-salt type solid solution $Cd_{0.9}Lu_{0.1}S$. As a result of the X-ray diffraction analysis, the so obtained solid solution was found to have a lattice constant $a_o$ of 5.440 A. The specific resistance measured at room temperature of the solid solution was $2.7 \times 10^3$ Ω-cm.

EXAMPLE 44

The procedures of Example 43 were repeated in the same manner except that the value of x was changed to 0.05 (the amount of Lu being 2.5 at. %), to obtain a mixture containing a minute amount of a rock-salt type solid solution.

As is seen from the above Examples relating to gadolinium, holmium, lanthanum and lutetium as well as the primarily illustrated Examples relating to ytterbium, with respect to other rare earth elements, namely, cerium, praseodymium, neodymium, promethium, samarium, europium, terbium, dysprosium, erbium, thullium and yttrium, similar results can be obtained. However, as is seen from the Examples relating to gadolinium in the chemical composition of the raw material in which the value of x exceeds 0.5, there is a fear that the $Th_3P_4$ phase or the oxysulphide phrase is formed in addition to the intended rock-salt type solid solution phase.

A solid solution of the chemical composition (Cd, A)S in which A includes two or more rare earth elements is illustrated in Example 45 given hereinafter.

EXAMPLE 45

The procedures of Example 32 were repeated in the same manner except that a raw material having the chemical composition $Cd_{1-x-y}Gd_xHo_yS$ in which x was 0.05 and y was 0.05 was used, to obtain a rock-salt type solid solution $Cd_{0.9}Gd_{0.05}Ho_{0.05}S$. As a result of the X-ray diffraction analysis, the so obtained solid solution was found to have a lattice constant $a_o$ of 5.460 A.

The specific resistance measured at room temperature of the rock-salt type solid solution was $1.1 \times 10^3$ Ω—cm.

EXAMPLE 46

Powdery cadmium sulphide and lead sulphide were mixed sufficiently in such amounts to provide a chemical composition $Cd_{1-x}Pb_xS$ in which x was 0.1, and the mixture was packed in a platinum capsule provided in the interior of a boron nitride capsule, following which it was charged in a pyrophellite installed with a carbon heater as a pressure medium. The platinum capsule was used for the purpose of preventing mingling of impurities. This pyrophellite was maintained under conditions of 20 – 30 Kbar and 600 – 800°C. for 2 – 5 hours by employing a girdle-type, super high pressure- and high temeprature-generating vessel. Then, the temperature was lowered to room temperature and subsequently the pressure was reduced to one atmosphere, to obtain a rock-salt type solid solution $Cd_{0.9}Pb_{0.1}S$.

Results of the X-ray diffraction of the so obtained solid solution are shown in Table 6. From these results, the lattice constant $a_o$ of the solid solution was calculated to be 5.495 A.

Table 6

Results of X-Ray Diffraction of Rock-Salt Type Solid Solution $Cd_{0.9}Pb_{0.1}S$

| Lattice Spacing (A) | Miller's Index | Intensity |
|---|---|---|
| 3.131 | 111 | 62 |
| 2.746 | 200 | 100 |
| 1.943 | 220 | 51 |
| 1.656 | 311 | 18 |
| 1.586 | 222 | 14 |

The specific resistance of the solid solution at room temperature was $4.0 \times 10^9$ to $6.2 \times 10^9$ Ω—cm. The activating energy obtained by the measurement of the specific resistance was 0.55 – 0.56 eV. It was found that the so obtained solid solution has photoconductivity.

EXAMPLES 47 to 49

The procedures of Example 46 were repeated in the same manner by changing the value of x in the chemical composition of the raw material as indicated in Table 7, to obtain rock-salt type solid solutions $Cd_{1-x}Pb_xS$. The product phase, the lattice constant calculated from the results of the X-ray diffraction analysis, the specific resistance at room temperature, the activating energy and the photoconductivity are shown in Table 7.

Table 7

Results of Synthesis of Rock-Salt Type Solid Solutions $Cd_{1-x}Pb_xS$

| | Value of (x) in composition | Product Phase | Lattice Constant (A) | Specific Resistance (Ω-cm) | Activating Energy (eV) | Photoconductivity |
|---|---|---|---|---|---|---|
| Example 47 | 0.2 | single phase of rock-salt type | 5.545 | $9.1 \times 10^7$ to $3.7 \times 10^7$ | 0.39 to 0.46 | observed |
| do. 48 | 0.5 | do. | 5.700 | $1.1 \times 10^7$ | 0.44 | do. |
| do. 49 | 0.9 | do. | 5.995 | $1.0 \times 10^3$ | 0.02 | — |

When lattice constants of solid solutions (Cd, Pb)S obtained in these Examples are plotted with respect to the value of x in the composition, a curve similar to a straight line can be obtained. From this fact, it is concluded that the Vegard's rule is substantially satisfied in the CdS-PbS system. Further, from the fact that in each composition a single phase of the solid solution of the rock-salt type was obtained, it is deemed that the rock-salt type solid solution (Cd, Pb)S was an all proportional solid solution.

EXAMPLE 50

The procedures of Example 46 were repeated in the same manner except that a raw material in which the value of $x$ in the chemical composition was 0.05 (the Pb amount being 2.5 at. %) was treated for 1 hour under conditions of 40 Kbar and 1,000°C., to obtain a mixture of a rock-salt type solid solution and cadmium sulphide of a poor crystallinity.

EXAMPLE 51

Powders of cadmium sulphide and tin sulphide were mixed sufficiently in such amounts to provide a chemical composition $Cd_{1-x}Sn_xS$ in which $x$ was 0.1 and the mixture was treated in the same manner as described in Example 46, to obtain a rock-salt type solid solution $Cd_{0.9}Sn_{0.1}S$ as a single phase. The specific resistance of the so obtained solid solution at room temperature was $1.8 \times 10^5$ Ω—cm.

EXAMPLE 52

The procedures of Example 51 were repeated in the same manner except that the value of x was changed to 0.3, to obtain a single phase of a rock-salt type solid solution $Cd_{0.7}Sn_{0.3}S$. As a result of the X-ray diffraction analysis, the so obtained solid solution was found to have a lattice constant $a_0$ of 5.500 A. The specific resistance of the solid solution at room temperature was $5.6 \times 10^4$ Ω—cm.

EXAMPLE 53

The procedures of Example 51 were repeated in the same manner except that the value of $x$ was changed to 0.05 (the Sn amount being 2.5 at. %), to obtain a mixture of a rock-salt type solid solution and cadmium sulphide of a poor crystallinity.

EXAMPLE 54

The procedures of Example 51 were repeated in the same manner except that the value of x was changed to 0.75 (the Sn amount being 37.5 at. %), to obtain a mixture of rock-salt type solid solution and SnS. The lattice constant $a_0$ of the rock-salt type solution was 5.510 A and the Sn content in the solid solution was 18 at. %.

EXAMPLE 55

Powders of cadmium sulphide, elementary germanium and sulphur were mixed sufficiently in such amounts to provide a chemical composition $Cd_{1-x}Ge_xS$ in which x was 0.25, and the mixture was treated in the same manner as described in Example 46, to obtain a rock-salt type solid solution $Cd_{0.75}Ge_{0.25}S$ as a single phase. As a result of the X-ray diffraction analysis, the so obtained solid solution was found to have a lattice constant $a_o$ of 5.435 A. The specific resistance of the solid solution at room temperature was $3.3 \times 10^8$ Ω—cm.

EXAMPLE 56

The procedures of Example 55 were repeated in the same manner except that the value of $x$ was changed to 0.1 (the Ge amount being 5 at. %), to obtain a mixture of a minute amount of a rock-salt type solid solution, a compound of the $Cd_4GeS_6$ type and cadmium sulphide of a poor crystallinity.

EXAMPLE 57

The procedures of Example 55 were repeated in the same manner except that the value of x was changed to 0.75 (the Ge amount being 37.5 at. %), to obtain a mixture of a rock-salt type solid solution, GeS and cadmium sulphide of the normal atmospheric pressure phase. The lattice constant $a_0$ of the solid solution was substantially the same as that of the solid solution obtained in Example 55.

EXAMPLE 58

Powders of cadmium sulphide, lead sulphide and tin sulphide were mixed sufficiently in such amounts to provide a chemical composition $Cd_{1-x-y}Pb_xSn_yS$ in which x was 0.2 and y was 0.1, and the mixture was treated as described in Example 46 for 15 hours under conditions of 20 Kbar and 600°C., to obtain a rock-salt type solid solution $Cd_{0.7}Pb_{0.2}Sn_{0.1}S$. As a result of the X-ray diffraction analysis, the so formed solid solution was found to have a lattice constant $a_0$ of 5.570 A.

From the results of the foregoing Example 51 to 58, solid solutions of cadmium sulphide with a sulphide of tin or germanium belonging to the same group as lead are present, and they can be synthesized by the high pressure reaction. Further, even in the case of a mixture of sulphides of group IV elements as in Example 58, a solid solution of cadmium sulphide is present and it can be synthesized by the high pressure reaction. It is expected that the yield of the solid solution of the rock-salt type can be increased by elevating the pressure in Examples 53 and 56 or adopting a relatively low pressure in Examples 54 and 57.

Referential Example 5

Powders of cadmium sulphide, silicon and sulphur were sufficiently mixed in such amounts to provide a chemical composition $Cd_{1-x}Si_xS$ in which x was 0.25, and the synthesis reaction was carried out for 15 hours under conditions of 20 Kbar and 550°C. in the same manner as described in Example 46. No solid solution of the rock-salt type was obtained.

Referential Example 6

Powders of cadmium sulphide, germanium sulphide, silicon and sulphur were mixed sufficiently in such amounts to provide a chemical composition $Cd_{1-x-y}Ge_xSi_yS$ in which x was 0.25 and y was 0.1, and the synthesis reaction was carried out for 15 hours under conditions of 20 Kbar and 550°C. in the same manner as described in Example 46. No solid solution of the rock-salt type was obtained.

As is seen from the results of Referential Examples 5 and 6, cadmium sulphide does not form a rock-salt type solid solution with sulphide of silicon which is included in the group IV element. Further, as is seen from the results of Referential Example 6, even when a part of other group IV element is replaced with silicon, a solid solution of the rock-salt type is not present.

As is seen from the foregoing explanation, in accordance with this invention there can be obtained novel solid solutions of the rock-salt type which are composed of cadmium sulphide and at least one sulphide of an alkaline earth metal, a rare earth metal, a group IV element or chromium and which have not heretofore been present.

In the foregoing Examples, a girdle-type, super high pressure- and high temperature-generating vessel, a carbon heater, a pyrophellite pressure medium, a boron nitride capsule and a platinum capsule provided in the interior of a boron nitride capsule were employed for the practice of the high pressure and high temperature synthesis reaction. However, in the practice of the method of this invention, use of such equipments is not an indispensable requirement but any of apparatuses capable of maintaining the raw material at desired pressure and temperature may be employed. Further, it is not necessarily indispensable that the raw material should be a powdery mixture of sulphides, but a mixture formed by blending constitutional elements of the intended rock-salt type solid solution in the form of simple substances or in the form of sulphides in such amounts as will give a desired composition may be used in this invention. It is possible to shorten the reaction time by elevating the pressure and temperature, but the applicable upper limits of the pressure and temperatures are naturally imposed depending on the structure and capacity of an apparatus yielding high pressure and temperature simultaneously.

It will be appreciated from the foregoing examples that the mixture of Cd and A of the solid solution is in an atomic ratio of about 1:1 with S and also that this ratio may have some variation. For example, in the case of a rare earth element being represented by A, this ratio ranges from about 1:1 to about 1:0.95.

It will also be appreciated that the high temperatures and high pressures employed for producing the solid solution having a rock-salt crystal structure are variable according to the element represented by A and the amount of A in the solution. Generally, the high temperature is above 400°C. and the high pressure may vary from at least about 10 Kbar and generally above 15 Kbar, but lower pressures may be employed in some cases.

Furthermore, it will be recognized that under 2.5 at. % of A can be replaced with barium or beryllium.

While the novel principles of the invention have been described, it will be understood that various omissions, modifications and changes in these principles may be made by one skilled in the art without departing from the spirit and scope of the invention.

What is claimed is:

1. A sulphide solid solution having a rock-salt structure at room temperature and normal atmospheric pressure, said solid solution being represented by the formula (Cd, A)S in which A is at least one element selected from the group consisting of Yb, Cr, Mg, Sr, Ca, La, Ce, Pr, Nd, Pm, Sm, Eu, Gd, Tb, Dy, Ho, Er, Tm, Lu, Y, Pb, Sn and Ge.

2. A solid solution set forth in claim 1 wherein A is at least one element selected from the group consisting of more than 5 at. % of Yb; 10 to 15 at. % of Cr; more than 25 at. % of Mg; more than 10 at. % of Sr; more than 2.5 at. % of Ca; more than 5 at. % of La, Ce, Pr, Nd, Pm, Sm, Eu, Gd, Tb, Dy, Ho, Er, Tm, Lu, Y and Pb; 5 to 18 at. % of Sn and 10 to 15 at. % of Ge.

3. A solid solution set forth in claim 1 wherein a part of A is replaced with at least one element selected from the group consisting of Ba and Be and A is at least one element selected from the group consisting of Mg, Sr, and Ca.

4. A method of producing a sulphide solid solution having a rock-salt structure at room temperature and normal atmospheric pressure, said solid solution being represented by the formula (Cd, A)S in which A is at least one element selected from the group consisting of Yb, Cr, Mg, Sr, Ca, La, Ce, Pr, Nd, Pm, Sm, Eu, Gd, Tb, Dy, Ho, Er, Tm, Lu, Y, Pb, Sn and Ge, said method comprising the steps of (a) providing a raw material comprising A, Cd and S in which each of A, Cd and S takes a form of at least one selected from the group consisting of a simple substance and a sulphide, said raw material being mixed to have a composition corresponding to the formula (Cd, A)S, (b) holding said raw material under high temperature and high pressure conditions where said solid solution is thermodynamically stable as rock-salt structure, and (c) lowering the temperature to room temperature and then reducing the pressure to normal atmospheric pressure.

5. A method set forth in claim 4 wherein A in said raw material is at least one element selected from the group consisting of more than 2.5 at. % of Yb, Sr, La, Ce, Pr, Nd, Pm, Sm, Eu, Gd, Tb, Dy, Ho, Er, Tm, Lu, Y and Pb, 5 to 20 at. % of Cr, more than 20 at. % of Mg, more than 1.5 at. % of Ca, 2.5 to 37.5 at. % of Sn and 5.0 to 37.5 at. % of Ge.

6. A method set forth in claim 4 wherein A is at least one element selected from the group consisting of more than 5 at. % of Yb, 10 to 15 at. % of Cr, more than 25 at. % of Mg, more than 10 at. % of Sr, more than 2.5 at. % of Ca, more than 5 at. % of La, Ce, Pr, Nd, Pm, Sm, Eu, Gd, Tb, Dy, Ho, Er, Tm, Lu, Y and Pb, 5 to 18 at. % of Sn and 10 to 15 at. % of Ge.

7. A method set forth in claim 4 wherein a part of A is replaced with at least one element selected from the group consisting of Ba and Be and the remaining part of A is at least one element selected from the group consisting of Mg, Sr and Ca.

* * * * *